United States Patent [19]
Yamada et al.

[11] 3,791,787
[45] Feb. 12, 1974

[54] PROCESS FOR DYEING CELLULOSE FIBERS

[75] Inventors: Yasushi Yamada, Yono; Hiroomi Hosoi, Urawa; Hiroaki Ohno, Tokyo; Teruhito Sotogoshi, Yono, all of Japan

[73] Assignee: Nippon Kayaku Kabushiki Kaisha, Tokyo, Japan

[22] Filed: July 27, 1972

[21] Appl. No.: 275,575

[30] Foreign Application Priority Data
Aug. 5, 1971  Japan.............................. 46-58668
Aug. 5, 1971  Japan.............................. 46-58669

[52] U.S. Cl. ........................... 8/54.2, 8/1 E
[51] Int. Cl. .............................. D06p 3/66
[58] Field of Search ............. 8/54.2, 163, 1 E

[56] References Cited
UNITED STATES PATENTS
3,143,390   8/1964   Heuberger et al. .................. 8/54.2
3,345,122   10/1967  Meininger et al. .................. 8/54.2
3,505,351   4/1970   Randall et al. ..................... 8/54.2 X Primary Examiner—Leon D. Rosdon
Assistant Examiner—T. J. Herbert, Jr.
Attorney, Agent, or Firm—Russell and Nields

[57] ABSTRACT

Cyclic alkylene carbonates or inorganic salts containing fluorine are used as reaction promoters in the fixation of reactive dyestuffs (other than those of resin type) to cellulose fibers under nearly neutral conditions.

10 Claims, 2 Drawing Figures

PROCESS FOR DYEING CELLULOSE FIBERS

DETAILED DESCRIPTION OF THE INVENTION

Figure 1:
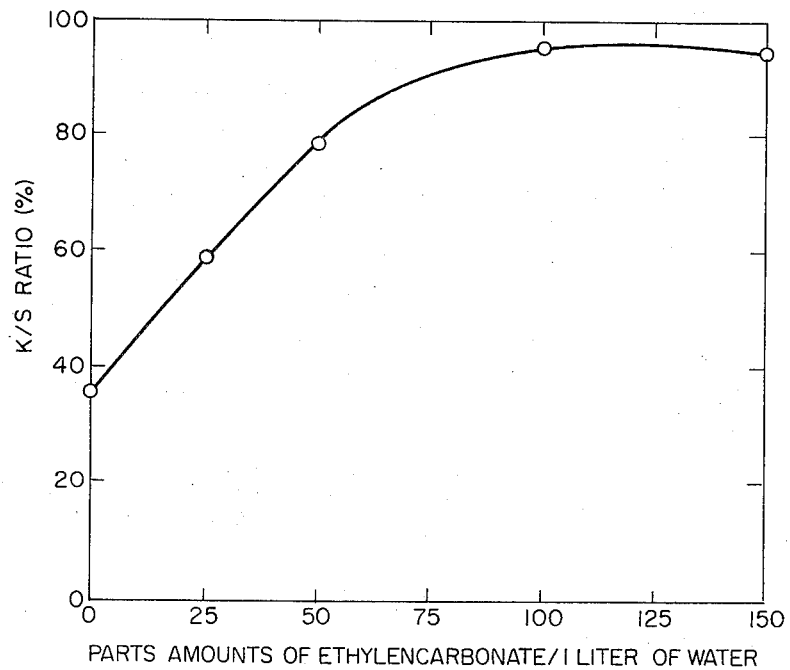

In the reaction fixation of all reactive dyestuffs other than those of resin type to cellulose, the presence of an acid binding agent is indispensable, which acid binding agent activates the cellulose fibers as cellulose anion to promote the reaction thereof with the dyestuffs.

However, various possible demerits of the acid binding agent have been known, for example, promotion of hydrolysis of the dyestuff, increase in breakdown of the bondage between the dyestuff and the fiber, yellowing of the cellulose at a high temperature and alkali discoloration of a disperse dye which is used together due to alkalinity of the acid binding agent.

Conventional acid binding agents used in the dyeing with reactive dyestuffs are caustic alkalis, sodium carbonate, sodium bicarbonate, sodium tertiary phosphate and sodium metasilicate. However, emergence of a reaction promotor having the same reaction-promoting effect as that of the acid binding agents but free from the above demerits has been expected.

After intensive investigations, the inventors have found that cyclic alkylene carbonates and inorganic salts containing fluorine are suitable reaction promotors of a high promoting effect on fixation of the reactive dyestuffs to cellulose fibers under nearly neutral conditions.

The reactive dyestuffs used in the present invention are those capable of forming covalent bonds by reacting with hydroxyl groups of cellulose in the presence of an acid binding agent. Reactive dyestuffs of resin type are not included in the reactive dyestuffs of this invention, since they are fixed by a treatment under heating in the presence of an acidic catalyst such as ammonium chloride. Examples of the reactive dyestuffs of resin type are methylol reactive dyestuffs such as those containing —NHCH$_2$OH or —NHCH$_2$OCH$_3$ group.

The reactive dyestuffs used in the present invention are those containing one or more reactive groups as shown below:

Dihalogeno-S-triazinyl,
Monohalogeno-S-triazinyl,
Dihalogenopyrimidinyl,
Trihalogenopyrimidinyl,
Methylsulfonylhalogenopyrimidinyl,
Dihalogenoquinoxalinyl,
Dihalogenophthalazinyl,
Dihalogenopyridazonyl,
Halogenobenzothiazolyl,
Methylsulfonylbenzothiazolyl
β-Sulfatoethylsulfonyl,
β-Halogenoethylsulfonyls,
N-Methyl-N-β-sulfatoethylsulfonylamino,
β-Sulfatoethylsulfamoyl,
β-Halogenoethylsulfamoyl,
Acryloyl,
α-Halogenoacryloyl,
α, β-Dihalogenopropionyl, The groups of dihalogeno-S-triazinyl, monohalogeno-S-triazinyl, β-Sulfatoethylsulfonyl, dihalogeno quinoxalinyl are particularly suitable.

No special limitation is made as to coloring matter and any of azo, anthraquinone, phthalocyanine and oxadine coloring matters may be used.

The cyclic alkylene carbonates are cyclic carbonic acid esters of primary and secondary dihydric alcohols. Ethylene carbonate and propylene carbonate are particularly suitable.

As inorganic salts containing fluorine, there may be mentioned potassium fluoride, sodium fluoride, acid potassium fluoride, acid sodium fluoride, sodium silicofluoride, potassium silicofluoride, calcium fluoride, aluminum fluoride, zinc fluoride, potassium borofluoride, sodium borofluoride, ammonium fluoride and antimony fluoride. Among these compounds, potassium fluoride, sodium fluoride, acid potassium fluoride and acid sodium fluoride are particularly preferred.

As cellulosic fibers, there may be mentioned natural and artificial fibers such as cotton, hemp, viscose rayon and viscose staple fibers and, in addition, mixed textiles of cellulose fibers and synthetic fibers such as polyester fibers.

The dyeing process of the present invention may be carried out in the same manner as in the dyeing of cellulose fibers with a reactive dyestuff in the presence of an acid binding agent. However, a dyeing temperature higher than that of said process (wherein an acid binding agent is used) is preferred in this invention. The temperature is above 100°C, preferably about 170°–210°C.

The fibers thus dyed have quite excellent fastness to various matters, particularly fastness to wetness and washing.

The process of the present invention will be illustrated by way of examples.

In the examples, the dyestuffs are shown to be free acids but they are used actually in the form of sodium or potassium salts.

EXAMPLE 1

A cotton cloth is padded with a solution of 30 parts of a dyestuff of the formula (1):

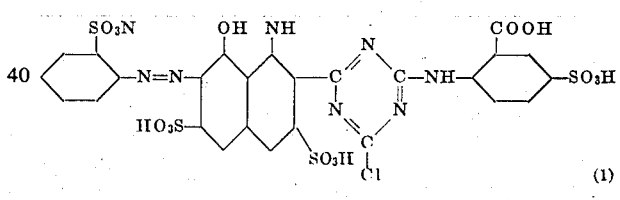

1 part of sodium alginate and 100 parts of ethylene carbonate in 1,000 parts of water to gain 75 percent weight increase. The cloth is subjected to intermediate drying at 100°C for 2–3 minutes and then to heat drying treatment at 200°C for 60 seconds.

After removing non-fixed dyestuff by washing with water and hot water, the cloth is soaped with 0.3 percent Monogen paste solution at 100°C for 10 minutes and washed with hot water and cold water.

Thus red dyeing fast to sunlight and washing is obtained without using acid binding agent, which is reactively fixed as firmly as in a dyeing obtained in the presence of an acid binding agent.

Reflectivity of the dyed cloth was measured and K/S (Kubelka-Munk's function) was calculated as a criterion of surface thickness of the cloth. Separately, a K/S of a cloth dyed under optimum dyeing conditions which have been recommended for the dyestuff (i.e. by using a padding bath containing 20 parts of soda ash, 150 parts of urea and 1 part of sodium alginate per 1,000 parts of the bath and fixing by heat drying at 200°C for 60 seconds), was measured and given to be 100.

The K/S as compared with the standard K/S 100 was calculated and plotted versus amount of ethylene carbonate in FIG. 1.

EXAMPLE 2

A cotton cloth is padded with a solution of 5 parts of the dyestuff of above formula (1), 1 part of sodium alginate and 5 parts of potassium fluoride in 1,000 parts of water to gain 75 percent weight increase. The cloth is subjected to intermediate drying at 100°C for 2-3 minutes and then to heat drying treatment at 200°C for 60 seconds. After removing non-fixed dyestuff by washing with water and then hot water, the cloth is soaped with 0.3 percent Monogen paste solution at 100°C for 10 minutes and washed with hot water and cold water.

Thus red dyeing fast to sunlight and washing is obtained without using acid binding agent, which is reactively fixed as firmly as a dyeing obtained in the presence of an acid binding agent.

Reflectivity of the dyed cloth was measured and K/S was calculated as a criterion of surface thickness of the cloth. Separately, a K/S of a cloth dyed under optimum dyeing conditions which have been recommended for the dyestuff (i.e. by using a padding bath containing 20 parts of soda ash, 100 parts of urea and 1 part of sodium alginate per 1,000 parts of the bath and fixing by heat drying at 200°C for 60 seconds) was measured and given to be 100.

Figure 2:
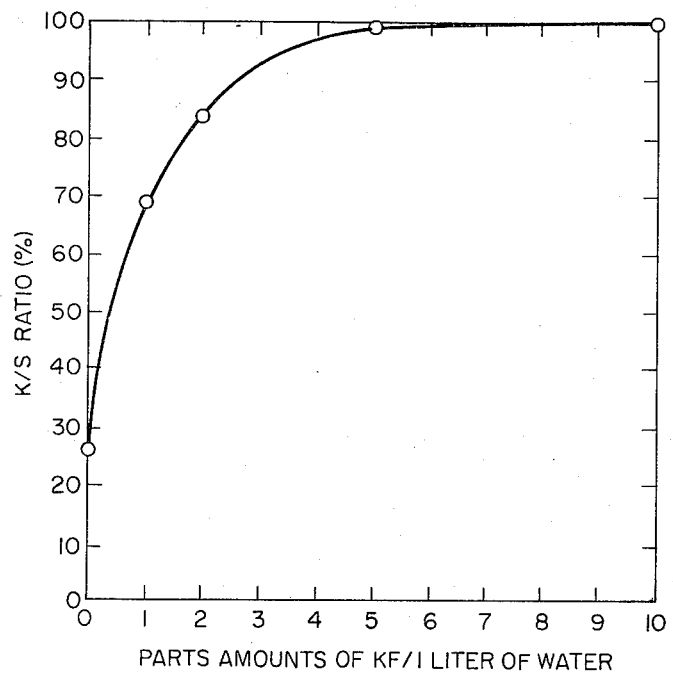

The K/S as compared with the standard K/S 100 was calculated and plotted versus amount of potassium fluoride in FIG. 2.

EXAMPLE 3

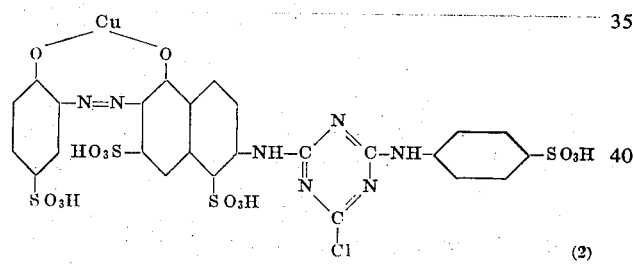

(2)

A printing paste of the following composition is prepared:

| | |
|---|---|
| Dyestuff of above formula (2) | 3 parts |
| Ethylene carbonate | 10 parts |
| Sodium alginate (5% aqueous Solution) | 50 parts |
| Warm Water | 37 parts |
| Total | 100 parts |

Thus obtained paste is applied to a cotton cloth on a roll printing machine.

After intermediate drying at 50°-60°C followed by hot drying fixation of 200°C for 1 minute, the cloth is washed with water, soaped, washed with water and dried.

Thus ruby dyeing fast to sunlight and washing is obtained without using acid binding agent, which is reactively fixed as firmly as in a dyeing obtained in the presence of an acid binding agent. The similar results are obtained if 1,2-propylene carbonate is used in the same amount in place of ethylene carbonate used in this example.

EXAMPLE 4

A printing paste of the following composition is prepared:

| | |
|---|---|
| Dyestuff of above formula (2) | 3 parts |
| Potassium fluoride | 1 part |
| Sodium alginate (5% aqueous Solution) | 50 parts |
| Warm Water | 46 parts |
| Total | 100 parts |

Thus obtained paste is applied to a cotton cloth on a roll printing machine.

After intermediate drying at 50°-60°C followed by hot drying fixation at 200°C for one minute, the cloth is washed with water, soaped, washed with water and dried. Thus ruby dyeing fast to sunlight and washing is obtained without using acid binding agent, which is reactively fixed as firmly as in a dyeing obtained in the presence of an acid binding agent.

The similar results are obtained if sodium fluoride is used in the same amount in place of potassium fluoride used in this example.

EXAMPLE 5

A mercerized cotton cloth is padded with a solution of 5 parts of a dyestuff of the formula (3):

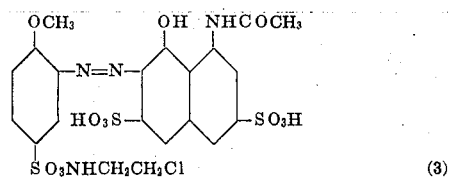

(3)

1 part sodium alginate and 20 parts of ethylene carbonate in 1,000 parts of water to gain 75 percent increase. The cloth is subjected to intermediate drying and then to heat drying treatment at 210°C for 90 seconds. After removing non-fixed dyestuff by washing with water and soaping treatment in the same manner as in Example 1, clear red dyeing fast to sunlight and washing is obtained, which is reactively fixed as firmly as in a dyeing in the presence of an acid binding agent.

The similar results are obtained if 1,2-propylene carbonate is used in the same amount in place of ethylene carbonate used in this example.

EXAMPLE 6

A mercerized cotton cloth is padded with a solution of 25 parts of the dyestuff of formula (3), 1 part of sodium alginate and 2 parts of sodium fluoride in 1,000 parts of water to gain 75 percent weight increase. The cloth is subjected to intermediate drying and then to heat drying treatment at 190°C for 90 seconds. Upon removing non-fixed dyestuff by washing with water and soaping treatment in the same manner as in Example 1, clear red dyeing fast to sunlight and washing is obtained, which is reactively fixed nearly as firmly as in a dyeing obtained in the presence of an acid binding agent.

The similar results are obtained if aluminum fluoride, zinc fluoride, sodium borofluoride, acid potassium fluoride or acid sodium fluoride is used in the same amount in place of sodium fluoride used in this example.

EXAMPLE 7

A cotton cloth is padded with a solution of 30 parts of a dyestuff of formula (4);

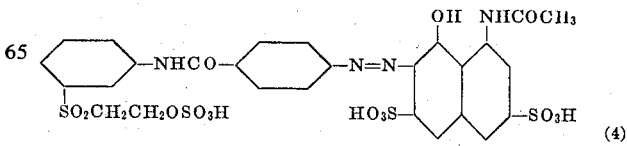

(4)

1 part of sodium alginate and 100 parts of ethylene carbonate in 1,000 parts of water to gain 75 percent weight increase. The cloth is subjected to intermediate drying followed by heat drying treatment at 200°C for 60 seconds. Upon washing with water followed by soaping treatment, red dyeing fast to sunlight and washing is obtained, which is reactively fixed as firmly as in a dyeing obtained in the presence of an acid binding agent.

If a dyestuff of formula (5):

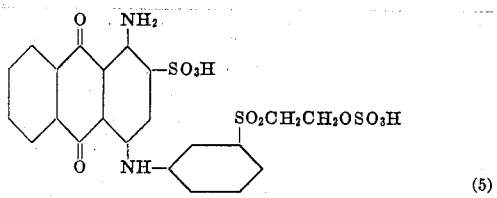

(5)

is used in place of the dyestuff used in this example, a blue dyeing fast to sunlight and washing is obtained in the same manner.

EXAMPLE 8

A cotton cloth is padded with a solution of 30 parts of the dyestuff of formula (4), 1 part of sodium alginate and 10 parts of potassium fluoride in 1000 parts of water to gain 75 percent weight increase. The cloth is subjected to intermediate drying followed by heat drying treatment at 200°C for 60 seconds. Upon washing with water followed by soaping treatment in the same manner as in Example 1, red dyeing fast to sunlight and washing is obtained, which is reactively fixed as firmly as in a dyeing obtained in the presence of an acid binding agent.

If the dyeing is effected in the same manner as above except that the dyestuff of formula (5) is used, blue dyeing fast to sunlight and washing is obtained.

EXAMPLE 9

A cotton cloth is padded with a solution of 20 parts of a dyestuff of formula (6):

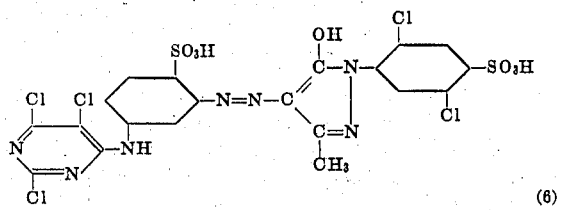

(6)

1 part of sodium alginate and 80 parts of ethylene carbonate in 1,000 parts of water to gain 75 percent weight increase. The cloth is subjected to intermediate drying followed by heat drying treatment at 200°C for 60 seconds. Upon washing with water followed by soaping treatment in the same manner as in Example 1, yellow dyeing fast to sunlight and washing is obtained, which is reactively fixed as firmly as in a dyeing obtained in the presence of an acid binding agent. The same results are obtained if a dyestuff of formula (7):

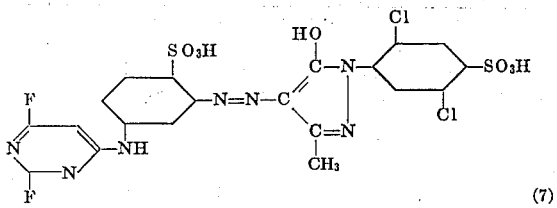

(7)

is used in place of the dyestuff used in this example.

EXAMPLE 10

A cotton cloth is padded with a solution of 20 parts of the dyestuff of formula (6), 1 part of sodium alginate and 5 parts of sodium fluoride in 1,000 parts of water to gain 75 percent weight increase. The cloth is subjected to intermediate drying followed by heat drying treatment at 200°C for 60 seconds. After washing with water followed by soaping treatment in the same manner as in Example 1, yellow dyeing fast to sunlight and washing is obtained, which is reactively fixed as firmly as in a dyeing obtained in the pressence of an acid binding agent.

The similar results are obtained if the dyestuff of formula (7) is used in place of the dyestuff used in this example.

EXAMPLE 11

A cotton cloth is padded with a solution of 15 parts of a dyestuff of formula (8):

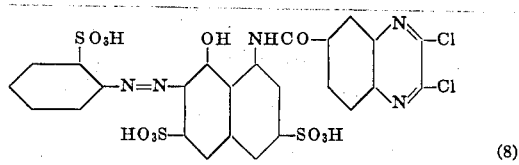

(8)

1 part of sodium alginate and 100 parts of ethylene carbonate in 1,000 parts of water to gain 75 percent weight increase. The cloth is subjected to intermediate drying followed by heat during treatment at 200°C for 60 seconds. After washing with water followed by soaping treatment, red dyeing fast to sunlight and washing is obtained, which is reactively fixed nearly as firmly as in a dyeing obtained in the presence of an acid binding agent.

EXAMPLE 12

A cotton cloth is padded with a solution of 15 parts of the dyestuff of formula (8), 1 part of sodium alginate and 2 parts of sodium fluoride in 1,000 parts of water to gain 75 percent weight increase. The cloth is subjected to intermediate drying followed by heat drying treatment at 200°C for 60 seconds. After washing with water followed by soaping treatment, red dyeing fast to sunlight and washing is obtained, which is reactively fixed nearly as firmly as in a dyeing obtained in the presence of an acid binding agent.

EXAMPLE 13

A cotton cloth is padded with a solution of 10 parts of a dyestuff of formula (9):

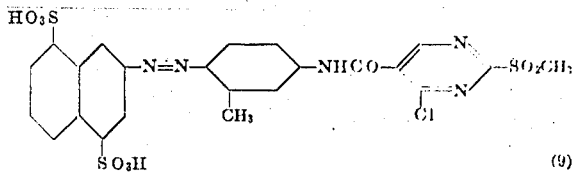

(9)

1 part of sodium alginate and 100 parts of ethylene carbonate in 1,000 parts of water to gain 60 percent weight increase. The cloth is subjected to intermediate drying followed by heat drying treatment at 200°C for 60 seconds. After washing with water followed by soaping treatment, yellow dyeing fast to sunlight and washing is obtained, which is reactively fixed nearly as firmly as in a dyeing obtained in the presence of an acid binding agent.

EXAMPLE 14

A cotton cloth is padded with a solution of 10 parts of the dyestuff of formula (9), 1 part of sodium alginate and 5 parts of potassium fluoride in 1,000 parts of water to gain 60 percent weight increase. The cloth is subjected to intermediate drying followed by heat drying treatment at 200°C for 60 seconds. After washing with water followed by soaping treatment, yellow dyeing fast to sunlight and washing is obtained which is reactively fixed nearly as firmly as in a dyeing obtained in the presence of an acid binding agent.

EXAMPLE 15

A mixed yarn of polyester fiber/cellulose fiber (63/35) is padded with a solution of 5 parts of a dyestuff of formula (10):

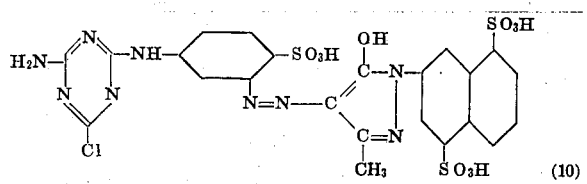
(10)

1 part of sodium alginate and 75 parts of ethylene carbonate in 1,000 parts of water to gain 60 percent weight increase. The cloth is subjected to intermediate drying followed by heat drying treatment at 200°C for 90 seconds. After washing with water followed by soaping treatment, yellow dyeing fast to sunlight and washing is obtained, which is reactively fixed nearly as firmly as in a dyeing obtained in the presence of an acid binding agent.

If the dyeing is effected in the same manner as above except that a dyestuff of formula (11):

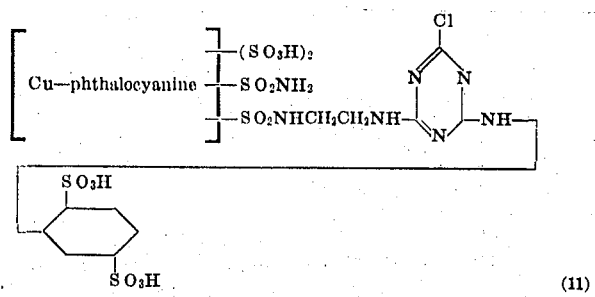
(11)

is used, bluish green dyeing of excellent fastness to sunlight and washing is obtained.

EXAMPLE 16

A mixed yarn of polyester fiber/cellulose fiber (65/35) is padded with a solution of 5 parts of the dyestuff of formula (10), 1 part of sodium alginate and 5 parts of potassium fluoride to gain 60 percent weight increase. The cloth is subjected to intermediate drying followed by heat drying treatment at 200°C for 60 seconds. After washing with water followed by soaping treatment, yellow dyeing fast to sunlight and washing is obtained, which is reactively fixed as firmly as in a dyeing obtained in the presence of an acid binding agent.

If the dyeing is effected in the same manner as above except that the dyestuff of formula (11) is used in place of the dyestuff used in this example, bluish green dyeing of excellent fastness to sunlight and washing is obtained.

EXAMPLE 17

A cotton cloth is padded with a solution of 5 parts of the dyestuff of Example 1, 1.5 parts of sodium alginate and 100 parts of ethylene carbonate in 1,000 parts of water to gain 70 percent weight increase. The cloth is subjected to intermediate drying followed by steaming with a high pressure steamer at 145°C under a pressure of 3.2 Kg/cm$^2$ for 2 minutes. After washing with water followed by soaping treatment, red dyeing of excellent fastness to sunlight and washing is obtained. If the dyeing is effected in the same manner as above except that a high temperature steamer is used in place of the high pressure steamer at 145°C for 2 minutes, the similar dyeing is obtained.

EXAMPLE 18

A cotton cloth is padded with a solution of 5 parts of the dyeing stuff of Example 1, 1.5 parts of sodium aliginate and 5 parts of sodium fluoride in 1,000 parts of water to gain 70 percent weight increase. The cloth is subjected to intermediate drying followed by steaming with a high pressure steamer at 145°C under a pressure of 3.2 Kg/cm$^2$ for 2 minutes. After washing with water followed by soaping treatment, red dyeing of excellent fastness to sunlight and washing is obtained.

If the dyeing is effected in the same manner as above except that a high temperature steamer is used in place of the high pressure steamer at 145°C for 2 minutes, the similar dyeing is obtained.

EXAMPLE 19

A cotton cloth is padded with a solution of 15 parts of a dyestuff of formula (12):

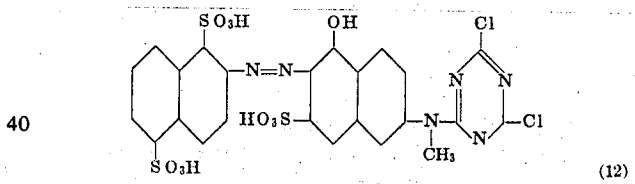
(12)

1 part of sodium alginate and 100 parts of ethylene carbonate in 1,000 parts of water to gain 75 percent weight increase. The cloth is subjected to intermediate drying followed by heat drying treatment at 200°C for 60 seconds. After washing with water followed by soaping treatment, orange dyeing of excellent fastness to sunlight and washing is obtained, which is reactively fixed nearly as firmly as in a dyeing obtained in the presence of an acid binding agent.

EXAMPLE 20

A cotton cloth is padded with a solution of 15 parts of the dyestuff of formula (12), 1 part of sodium alginate and 2 parts of sodium fluoride in 1,000 parts of water to gain 75 percent weight increase. The cloth is subjected to intermediate drying followed by heat drying treatment at 200°C for 60 seconds. After washing with water followed by soaping treatment, orange dyeing is obtained which is reactively fixed nearly as firmly as in a dyeing obtained in the presence of an acid binding agent.

EXAMPLE 21

A cotton cloth is padded with a solution of 25 parts of a deystuff of formula (13):

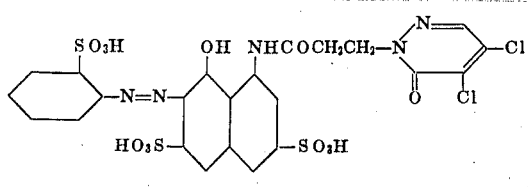

(13)

1 part of sodium alginate and 100 parts of ethylene carbonate in 1,000 parts of water to gain 75 percent weight increase. The cloth is subjected to intermediate drying followed by heat drying treatment at 200°C for 60 seconds. After washing with water followed by soaping treatment, red dyeing is obtained, which is reactively fixed nearly as firmly as in a dyeing obtained in the presence of an acid binding agent.

nate and 5 parts of potassium fluoride to gain 75 percent weight increase. The cloth is subjected to intermediate drying followed by heat drying treatment at 200°C for 60 seconds. After washing with water followed by soaping treatment, red dyeing is obtained, which is reactively fixed nearly as firmly as in a dyeing obtained in the presence of an acid binding agent.

EXAMPLE 23

The procedure of Example 21 and 22 was repeated each of the dyestuffs shown by the following formulas (14) – (18) instead of the dyestuff of formula (13).

The dyeing is obtained, which is reactively fixed nearly as firmly as in a dyeing obtained in the presence of an acid binding agent.

The hues of the dyed cloths obtained is shown to the right of the respective formulas.

| Dyestuff | Number | Hue |
|---|---|---|
| [structure] | (14) | Red. |
| [structure] | (15) | Red. |
| [structure] | (16) | Red. |
| [structure] | (17) | Yellow. |
| [structure] | (18) | Orange. |

EXAMPLE 22

A cotton cloth is padded with a solution of 25 parts of the dyestuff of formula (13), 1 part of sodium algi-

We claim:

1. A process for dyeing cellulose fibers, comprising dyeing cellulose fibers with a reactive dyestuff other than those of resin type in the presence of a reaction promoter consisting of cyclic alkylene carbonate or an inorganic salt containing fluorine.

2. A process according to claim 1, wherein said reaction promoter is a cyclic alkylene carbonate.

3. A process according to claim 1, wherein said reaction promoter is an inorganic salt containing fluorine.

4. A process according to claim 2, wherein said reaction promoter is ethylene carbonate.

5. A process according to claim 3, wherein said reaction promoter is potassium fluoride.

6. A process according to claim 3, wherein said reaction promoter is sodium fluoride.

7. A process according to claim 1, wherein said reactive dyestuff contains dihalogeno-s-triazinyl group.

8. A process according to claim 1, wherein said reactive dyestuff contains monohalogeno-s-triazinyl group.

9. A process according to claim 1, wherein said reactive dyestuff contains β-sulfatoethylsulfonyl group.

10. A process according to claim 1, wherein said reactive dyestuff contains dihalogenoquinoxalinyl group.

* * * * *